United States Patent Office 3,401,137
Patented Sept. 10, 1968

3,401,137
POLYESTERURETHANE COMPOSITION AND
METHOD OF PREPARATION
Anthony F. Finelli, Akron, Ohio, assignor to The Goodyear Tire & Rubber Company, Akron, Ohio, a corporation of Ohio
No Drawing. Continuation of application Ser. No. 274,322, Apr. 19, 1963. This application Sept. 28, 1966, Ser. No. 582,521
13 Claims. (Cl. 260—30.6)

ABSTRACT OF THE DISCLOSURE

This invention relates to a method of producing a rubbery polyurethane composition which has exceptionally good low temperature properties by reacting about 1.5 to 2.5 mols of an organic polyisocyanate containing essentially two isocyanate groups with one mol of a dihydroxy polyester mixture comprising about 20 to 70 mole percent of polytetramethylene adipate of about 750 to 2500 molecular weight and about 80 to 30 mol percent of an alkylene adipate of about 1000 to 3000 molecular weight, where the alkylene radical contains from 2 to 3 carbon atoms, inclusive, and curing with about .5 to .9 mol of an aromatic diamine for each mol of isocyanate in excess of that equivalent to the dihydroxy terminated polyester.

---

This case is a continuation of 274,322 filed Apr. 19, 1963, now abandoned.

This invention relates to cured rubbery random blocked polyester urethane compositions. More specifically, this invention relates to a method of preparing cured rubbery random blocked polyurethane compositions containing polyadipate ester groups.

The polyester urethanes prepared and used commercially are predominantly linear molecules containing adipate groups. These polyurethanes have excellent abrasion resistance, oil resistance, tensile strength and other properties at ambient temperature and consequently are useful for the manufacture of articles such as tires, belting and the like. However, it has long been recognized that the adipate polyester urethanes have relatively poor low temperature performance as they tend to set and become brittle at the low temperatures encountered in the Arctic regions or in the upper atmosphere. Although recent patents have taught to utilize glutarate esters or mixed adipate esters to prepare polyurethanes, these polyurethanes have also exhibited a tendency to become brittle at around a −60° C. or at even warmer temperatures. Consequently, there is a need for a polyester urethane of the rubbery type which has improved low temperature properties as well as satisfactory ambient temperature properties.

It is an object of this invention to provide a method of preparing adipate polyester urethane compositions which have satisfactory physical properties at temperatures below −60° C.

The polyurethane compositions of this invention are prepared by reacting about 1.5 to 2.5 mols of an organic polyisocyanate containing essentially two isocyanate groups with about 1 mol of a hydroxyl terminated polyester mixture comprising at least about 20 to 70 mol percent of a polytetramethylene adipate having a molecular weight of from about 750 to 2500 and about 80 to 30 mol percent of an alkylene adipate having a molecular weight of about 1000 to 3000 with said alkylene radical containing from 2 to 3 carbon atoms inclusive and about 0.5 to 0.9 mol of an aromatic diamine for each mol of polyisocyanate in excess of that equivalent to the dihydroxy terminated polyester. The preferred ratio of organic polyisocyanate to polyester is about 1.8 to 2.2 Also the ratio of alkylene adipate may vary from 100% ethylene adipate to 100% propylene adipate with the preferred alkylene adipate being formed by forming a mixture of ethylene glycol and propylene glycol wherein the ratios of ethylene glycol to propylene glycol is about 3–4 to 1, with this glycol mixture being esterified with adipic acid to give an adipate having a molecular weight of at least about 1000 to about 3000 with the preferred molecular weight range being about 1500 to 2500. The tetramethylene adipate may be made by esterifying butane-1, 4-diol with adipic acid to give a polyester having a molecular weight from about 750 to 2500. As the molecular weight of the tetramethylene adipate exceeds about 1800 the tendency for it to form crystalline polyurethanes is appreciably enhanced. It is possible to use as little as 20% tetramethylene adipate of the lower molecular weight (Ca. 900–1500) with the adkylene adipates and still obtain a polyurethane having satisfactory ambient and −65° C. physical properties. Where the polyester organic diisocyanate prepolymer is to be dissolved in a solvent and then be reacted with the organic diamine with the resulting reaction mixture being applied by spraying, it has been found that the amount of tetramethylene adipate should not exceed about 70% to obtain satisfactory storage properties as well as satisfactory spreading of the spray coat. It is a preferred practice that the dihydroxyl terminated polyester mixture contain at least about 25% and no more than about 66% of the tetramethylene adipate with the alkylene adipate being from about 75% to 34% of the polyester mixture.

Any suitable organic polyisocyanate may be utilized in the process of this invention, such as, for example, ethylene diisocyanato, propylene diisocyanate, tetramethylene diisocyanate, pentamethylene diisocyanate, octamethylene diisocyanate, undecamethylene diisocyanate, dodecamethylene diisocyanate and 3,3'-diisocyanate dipropylether; cyclopentylene-1,3-diisocyanate, cyclohexylene-1,4-diisocyanate, 2,4-tolylene diisocyanate, 2,6-tolylene diisocyanate and mixtures of 2,4- and 2,6-tolylene diisocyanate, xylylene - 1,4 - diisocyanate, xylylene-1,3-diisocyanate, 4,4' - diphenylmethane diisocyanate, 2-nitrodiphenyl-4,4'-diisocyanate, 4,4'-diphenyl propane diisocyanate, p-isocyanato benzyl isocyanate, m-phenylene diisocyante, p-phenylene diisocyanate, naphthylene-1,4-diisocyanate, 3,3'-dimethyl-4,4'-diphenylene-diisocyanate, furfurylidene diisocyanate, p,p', p''-triphenyl methane triisocyanate and diphenyl-4,6-4'-triisocyanate. The aromatic diisocyanates are, however, preferred.

The aromatic diamines useful in this invention are used in the amount of about 0.5 to 0.9 mol per mol of excess organic polyisocyanate over that equivalent to the polyester.

Preferred results are obtained when the amount of aromatic diamine is about 0.6 to 0.8 mol based on the excess organic polyisocyanate. Representative examples of suitable aromatic diamines where conventional techniques are to be used, are the so-called slow diamines such as methylene bis ortho chloroaniline, ortho dichloro benzidine, 4,4'-bis amino phenyl sulfone. Representative examples of suitable fast diamines are 4,4'-methylene dianiline, methyl tolidine, tolylene diamine, o-tolidine, o-dianisidine. The fast diamines are dissolved in a suitable solvent before use.

The following examples illustrate the invention without, however, limiting it:

Example I

An 80 mol percent ethylene-20 mol percent propylene adipate (200 parts) having a reactive number of 63.5 and 200 parts of tetramethylene adipate having a reactive number of 55.3 was placed in a two liter resin flask and then the polyesters were dried under vacuum at 90–110° C. for one hour. Then 74.7 parts of tolylene diisocyanate was added to the flask. The reaction was allowed to proceed for one hour at 88–114° C. (atmospheric pressure). A vacuum was then applied for twenty minutes. A mixture of 40.8 parts of 4,4'-methylene bis(2-chloroaniline) and 20 parts of the above polyester were added to the prepolymer. After stirring for 30 seconds samples were poured for tensile sheet, abrasion and compression set test. The samples were oven cured 24 hours at 90° C. After cooling the stocks had a Shore A hardness of 74 and were homogeneous and clear. The following physicals were obtained:

Tensile (p.s.i.) _____ 5895.
Elongation percent _____ 650.
300% modulus _____ 1154.
Bureau of Standard
  abrasion _____ 150.
Masland Bend Test ____ OK at —80° F.
Gehman Torsion Test,
  ° F. _____ $T_2/5/10/100$—20.5°/—27.5°/
                       —31.5°/—60° C.

Example II

A casting was made as in Example I from a reactive mixture of 200 parts of 80 mol percent ethylene-20 mol percent propylene adipate having a reactive number of 63.5 and 200 parts of tetramethylene adipate having a reactive number of 55.3, 107 parts of diphenylmethane-4,4'-diisocyanate and a mixture of 40.8 parts of 4,4'-methylene bis(2-chloroaniline) dispersed in 20 parts of the above polyester. The casting melt was poured into molds and was heated 20 hours at 200° F. After cooling, the sheets were translucent and homogeneous and had the following physical properties:

Tensile (p.s.i.) _____ 5257.
Elongation percent ____ 590.
Bureau of Standard
  abrasion _____ 132.
300% modulus _____ 1200.
Masland Bend Test ___ OK at —80° F.
Gehman Torsion Test
  ° C. _____ —19.5°/—27°/—30°/—47° C.
Shore A _____ 76.

Example III

A casting was prepared from 100 parts tetramethylene adipate having a reactive number of 55.3 and 300 parts of 80 mol percent ethylene-20 mol percent propylene adipate having a reactive number of 63.5, 78 parts tolylene diisocyanate and 45 parts of 4,4'-methylene bis(2-chloroaniline). The clear, homogeneous melt was cast into molds and was oven cured. After cooling, the homogeneous and translucent sheets had a Shore A hardness of 82. After 18 days, the stocks were still homogeneous and translucent and had the following physical properties:

Tensile (p.s.i.) _____ 5195.
Elongation percent ___ 650.
300% modulus _____ 1170.
Crescent Tear lbs./
  in. _____ 463.
Gehman Torsion
  Test _____ —17.5°/—25°/—27.5°/—47° C.
Masland Bend Test ___ OK at —60° F.
Shore A _____ 82.

Example IV

A casting from two parts of 80 mol percent ethylene-20 mol percent propylene adipate having a reactive number of 63.5 and one part of tetramethylene adipate having a reactive number of 55.3 with tolylene diisocyanate and 4,4'-methylene bis(2-chloroaniline) produces a homogeneous, translucent sheet. After cooling, the Shore A hardness was 81. It showed a Shore A hardness of 83 after 14 days. The Masland Bend Test was OK at —90° F.

Example V

A prepolymer was prepared from 2 mols of an 80 percent ethylene-20 percent propylene adipate having a reactive number of 60±5, 1 mol of tetramethylene adipate having a reactive number of 56, and 6 mols of an 80/20 mixture of 2,4/2,6-tolylene diisocyanate. A dispersion of the prepolymer was prepared according to the following recipe:

| | Parts |
|---|---|
| Prepolymer | 2000 |
| 2-nitropropane | 600 |
| methyl ethyl ketone | 600 |
| 10% cellulose acetate butyrate in Cellosolve acetate | 100 |
| Lamp black | 20 |

The prepolymer dispersion (50 parts) was added to 2,2 parts of 4,4'-diamino-diphenylmethane in 10 grams of 2-nitropropane with good stirring. Then the mixture was spread on a flat metal surface and a doctor blade was used to spread the mixture to form a film. The film was tack free in eight to ten minutes. One sample was allowed to air cure at room temperature while another was oven cured at 96° C. for three hours. The properties of these two samples are given below:

| Film cure condition | Room temp. | 3 hrs./96° C. |
|---|---|---|
| Tensile (p.s.i.) | 4,200 | 5,500 |
| Elongation, percent | 590 | 500 |
| Modulus, percent: | | |
| 100 | 700 | 800 |
| 300 | 1,200 | 1,600 |
| 500 | 2,900 | |

Masland Cold Crease Test OK at 90° F.
Volume change in 70/30 $\frac{\text{Isooctane}}{\text{Toluene}}$ (4 days) 15.6%.

By the term "fast amine crosslinkers" is meant those diamines which develop a turbidity inside of about 10 to less than 25 seconds with the boiling methylene chloride test. By this method essentially a saturated solution of the diisocyanate and diamine are each made up in methylene chloride. This usually gives about .2 to .5 molar solution of the diisocyanate and the diamine when dissolved in methylene chloride. The boiling methylene chloride solutions of the diamine and the polyisocyanate are mixed and then the time required to develop a turbidity is measured. Those diamines which develop turbidity after 30 seconds are considered to be slow diamines.

When using the fast diamine or amino alcohol crosslinkers it is preferred to dissolve the crosslinker in a solvent or a carrier such as a plasticizer or extender oil or materials of a similar nature. Some suitable plasticizers are tricresyl phosphate, tributoxy ethyl phosphate and dibutyl phthalate. These plasticizers can be used in amounts up to as much as about 50–60% of the polyurethane, hence the fast diamines can be used to make castings with suitable pressurized 2-component mixing equipment.

Any of the non-reactive solvents normally used in making paints which are suitable for spraying may be used in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, Cellosolve propylate, Cellosolve acetate butyrate, dioxane, lower boiling nitro alkanes, etc. Mixtures of certain solvents in particular amounts may be desirable to obtain satisfactory spreading properties and evaporation rates when the polyurethane spray composition is applied to a surface. This is especially true where very volatile solvents such as benzene and acetone are used.

Also, it is desirable to add to the spray composition certain pigments and other additives such as surface active agents, leveling agents, for instance, cellulose acetate butyrate, and other additives well known to the spray coating art. In particular, it is desirable to add about 0.5 to 5 parts and preferably about 1 to 2 parts of a pigment on a hundred parts of prepolymer basis to improve the weather and reflective characteristics.

Submicroscopic pyrogenic silica such as prepared in a hot gaseous environment by the vapor phase hydrolysis of silicon tetrachloride and available from Godfrey L. Cabot, Inc. under the trademark Cab-O-Sil is especially useful as a leveling agent in the sprayable polyurethane compositions when used in about 0.1 to 15 parts per 100 parts of solids in the solution. The preferred amount is about 0.5 to about 6 parts as the amount of solvent needed to give a sprayable viscosity is not materially changed. Also, this range of pyrogenic silica gives good thixotropic properties to the resulting sprayable composition.

With the more soluble crosslinkers the amount of carrier or solvent used may be as low as about 5% to 25% by weight and still with suitable pressurized mixing equipment films can be formed or castings be made. On the other hand, the very short pot life, i.e. 5 to 20 seconds and/or less soluble diamines may require from 25 to about 80% or even more of the carrier to permit the reaction mixture to be sprayed or spread as a film or coating on cloth. Hence, the amount of carrier or solvent can conveniently be varied from a low of about 5% to in excess of 80% by weight to obtain the processing properties desired. A preferred range of solvent is from about 10% to about 70% based on the mixture of polyester, diamine and polyisocyanate as this range of solvents permits spray coating, spreader coating and film spreading to be accomplished. The fast diamines listed on page 4 may be used to replace the 4,4'-diamino diphenyl methane in Example V and the resulting fluid reaction mixture may be spread to form continuous films and to spread coat cloth provided the amount of carrier or solvent is adjusted and a pressurized two component spray gun or mixer is used to apply the material to the surface to be coated. In some instances the pressure may need to exceed about 1000 to 2000 pounds per square inch where the amount of solvent is less than about 50%.

Normally there is no need to cure the fluid reaction mixture containing the fast diamines at elevated temperature as ambient temperature cures are adequate but those reaction mixtures containing the slow diamines may need to be cured at elevated temperatures. Also, it has been found convenient and even advantageous in some cases to cure the reaction mixtures containing both slow and fast diamines at elevated temperatures of about 40 to 160° C. for about 1 to 30 hours.

The Masland Bend Test is run on a strip of the cured polyurethane elastomer 2 inches by 6 inches by ¼ inch on its edges. The strip is bent back on itself to juxtaposition its ends on each other and then stapled in this position. The bent strip is mounted in a cold box and cooled to the test temperature at rate of about 10° F. each 6 to 8 minutes. Then the sample is maintained at the test temperature, usually each 10 degree interval from −30° F. to the break point, for one hour, at which time the bent sample is subject to a quick blow of 2.5 foot pounds. The temperature at which the sample breaks or shatters is taken as the Masland break point.

While certain representative embodiments and details have been shown for the purpose of illustrating the invention, it will be apparent to those skilled in the art that various changes and modifications may be made therein without departing from the spirit or scope of the invention.

What is claimed is:

1. A polyester urethane composition comprising a rubbery reaction product of
   (1) about 1.5 to 2.5 mols of an organic polyisocyanate containing essentially two isocyanate groups with
   (2) about 1 mol of a dihydroxy polyester mixture comprising at least about 20 to 70 mol percent of a polytetramethylene adipate having a molecular weight of from about 750 to 2500 and about 80 to 30 mol percent of an alkylene adipate having a molecular weight of at least about 1000 to about 3000 with said alkylene radical containing from 2 to 3 carbon atoms inclusive, and
   (3) about 0.5 to 0.9 mol of an aromatic diamine for each mol of polyisocyanate in excess of that equivalent to the dihydroxy terminated polyester.

2. The polyester urethane of claim 1 wherein the alkylene adipate contains no more than about 80 mol percent of an alkylene radical having two carbon atoms with the remainder of the alkylene radicals containing three carbon atoms.

3. The polyester urethane of claim 1 wherein the diamine is one which does not produce a turbidity within 30 seconds when a boiling semi-molar solution of said diamine in methylene chloride is mixed with a boiling semi-molar solution of the organic polyisocyanate in methylene chloride.

4. The shaped and dimensioned polyester urethane of claim 1 wherein the aromatic diamine is one which produces a turbidity within 10 to 25 seconds when essentially a saturated but not in excess of a semi-molar methylene chloride solution of the diamine is mixed at the boiling point of the solution with a boling semi-molar methylene chloride solution of the organic polyisocyanate.

5. The polyester urethane of claim 1 wherein the organic polyisocyanate is essentially a tolylene diisocyanate.

6. The polyester urethane of claim 3 wherein the alkylene adipate contains no more than about 80 mol percent of an alkylene radical having two carbon atoms with the remainder of the alkylene radical containing three carbon atoms.

7. The polyester urethane of claim 4 wherein the alkylene adipate contains no more than about 80 mol percent of an alkylene radical having two carbon atoms with the remainder of the alkylene radicals containing three carbon atoms.

8. The polyester urethane of claim 5 wherein the diamine is 4,4'-methylene bis(2-chloroaniline).

9. A fluid polyurethane reaction mixture comprising
   (1) from about 5 to about 80% of a carrier, and
   (2) from about 95 to 20% of a mixture of
      (a) about 1.5 to 2.5 mols of an organic polyisocyanate containing essentially two isocyanate groups with
      (b) about 1 mol of a dihydroxy polyester mixture comprising at least about 20 to 70 mol percent of a polytetramethylene adipate having a molecular weight of from about 750 to 2500 and about 80 to 30 mol percent of an alkylene adipate having a molecular weight of at least about 1000 to about 3000 with said alkylene radical containing from 2 to 3 carbon atoms inclusive, and
      (c) about 0.5 to 0.9 mol of an aromatic diamine for each mol of polyisocyanate in excess of that equivalent to the dihydroxy terminated polyester, said aromatic diamine being one which produces a turbidity within 10 to 25 seconds when essentially a saturated but not in excess of a semi-molar methylene chloride solution of the diamine is mixed at the boiling point of the solution with a boiling semi-molar methylene chloride solution of the organic polyisocyanate.

10. The fluid polyurethane reaction mixture of claim 9 wherein about 0.1 to 15 parts of a submicroscopic pyrogenic silica is present for each 100 parts of the mixture of polyester, diamine and polyisocyanate.

11. The fluid polyurethane reaction mixture of claim 9 wherein the diamine is selected from the class consisting of 4,4'-diamino-diphenyl methane, tolylene diamine, o-tolidine, and o-dianisidine.

12. The fluid polyurethane reaction mixture of claim 9 wherein the carrier is selected from the plasticizers consisting of tricresyl phosphate, tributoxy ethyl phosphate and dibutyl phosphate and the amount of the carrier is no more than about 60% by weight.

13. The fluid polyurethane reaction mixture of claim 12 wherein the diamine is one which produces a turbidity within 10 to 25 seconds when essentially a saturated but not in excess of a semi-molar methylene chloride solution of the diamine is mixed at the boiling point of the solution with a boiling semi-molar methylene chloride solution of the organic polyisocyanate.

References Cited

UNITED STATES PATENTS

| 2,880,192 | 3/1959 | Coffey | 260—757 |
|---|---|---|---|
| 2,983,702 | 5/1961 | Little | 260—77.5 |
| 2,953,533 | 9/1960 | Khawam | 260—40 |

FOREIGN PATENTS 640,597  7/1950  Great Britain.

JULIUS FROME, *Primary Examiner.*

PO-1050
(5/69)

UNITED STATES PATENT OFFICE
CERTIFICATE OF CORRECTION

Patent No. 3,401,137           Dated September 10, 1968

Inventor(s) Anthony F. Finelli

It is certified that error appears in the above-identified patent and that said Letters Patent are hereby corrected as shown below:

In the specification, column 2, line 18, the word "adkylene" should read -- alkylene --; column 4, line 36, "90°F." should read -- -90°F. --.

SIGNED AND
SEALED
DEC 23 1969

(SEAL)
Attest:

Edward M. Fletcher, Jr.
Attesting Officer

WILLIAM E. SCHUYLER, JR.
Commissioner of Patents